United States Patent
Hsu et al.

(10) Patent No.: US 10,963,112 B1
(45) Date of Patent: Mar. 30, 2021

(54) TOUCH PANEL AND METHOD OF FORMING THEREOF

(71) Applicant: TPK Advanced Solutions Inc., Fujian (CN)

(72) Inventors: Wei You Hsu, New Taipei (TW); Wei Chen Huang, New Taipei (TW); Liang Yi Chang, Taoyuan (TW); Han Wei Chen, Taipei (TW); Ho Chien Wu, New Taipei (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 16/995,923

(22) Filed: Aug. 18, 2020

(30) Foreign Application Priority Data

Dec. 24, 2019 (CN) .......................... 201911341855.X

(51) Int. Cl.
*G06F 3/044* (2006.01)
(52) U.S. Cl.
CPC .. *G06F 3/0443* (2019.05); *G06F 2203/04103* (2013.01)
(58) Field of Classification Search
None
See application file for complete search history.

(56) References Cited

U.S. PATENT DOCUMENTS 10,697,919 B2 * 6/2020 Tsai ..................... G01N 27/128
2020/0272263 A1 * 8/2020 Hsiao ..................... G06F 3/047

FOREIGN PATENT DOCUMENTS

| CN | 103412688 A | 11/2013 |
| CN | 105320369 A | 2/2016 |
| CN | 105448423 A | 3/2016 |

* cited by examiner

*Primary Examiner* — Duane N Taylor, Jr.
(74) *Attorney, Agent, or Firm* — Cooper Legal Group, LLC

(57) ABSTRACT

A method of forming touch panels includes providing a substrate with a visible area and a periphery area, forming a metal layer, forming a metal nanowire layer with a first portion in the visible area and a second portion in the periphery area, and performing a patterning process. Forming the metal layer includes substrate pre-treatment, adjusting a characteristic of the substrate surface, forming a catalytic center on the substrate surface, adjusting an activity of the catalytic center, and performing electroless plating on the substrate surface to form the metal layer. The patterning process includes forming a plurality of periphery lead wires from the metal layer while forming a plurality of etching layer from the metal nanowire layer using an etchant that etches the metal layer and the metal nanowire layer.

20 Claims, 14 Drawing Sheets

TOUCH PANEL AND METHOD OF FORMING THEREOF

CROSS-REFERENCE TO RELATED APPLICATION

This application claims priority to China Application Serial Number 201911341855.X, filed Dec. 24, 2019, which is herein incorporated by reference in its entirety.

BACKGROUND

Field of Disclosure

The present disclosure relates to a touch panel and a method of forming the same. More particularly, the present disclosure relates to a touch panel with electroless plating metal layers and a method of forming the same.

Description of Related Art

In recent years, transparent conductors can simultaneously allow light to pass through and provide proper conductivity, so they are often used in many display or touch-related devices. Generally speaking, the transparent conductor can be various metal oxides, such as Indium Tin Oxide (ITO), Indium Zinc Oxide (IZO), Cadmium Tin Oxide (CTO), or Aluminum-doped Zinc Oxide (AZO). However, these metal oxides cannot meet the flexibility requirements of display devices. Therefore, a variety of flexible transparent conductors have been developed, such as transparent conductors made of materials such as nanowires. In addition, traces in a peripheral area are traditionally formed by electroless plating in touch-related devices. Before the electroless plating process begins, a catalytic layer needs to be formed on the substrate to facilitate the growth of the electroless layer. At present, the cost of the chemical liquid and the manufacturing process for forming the catalytic layer are too high, and the chemical liquid is not easy to obtain, which results in a major problem in the manufacturing process.

There are still many problems to be solved in the described nanowire process technology. For example, the nanowire is used to make touch electrodes, and an alignment error area needs to be reserved when the nanowire is aligned with the lines (i.e., traces) in the peripheral area. The alignment error causes the size of the lines in the peripheral area to be unable to be reduced, which leads to a larger width of the peripheral area. In particular, when a roll-to-roll process is used, a deformation of the substrate causes the size of the alignment error area to be more enlarged (for example, 150 μm), so the minimum width of the peripheral area is only 2.5 mm, which will not meet the requirements for a narrow border of the display.

SUMMARY

The disclosure provides a method for forming a touch panel, which includes providing a substrate, forming a metal layer, forming a metal nanowire layer, and performing a patterning process. The substrate includes a visible area and a periphery area. Forming the metal layer includes performing pre-treatment of the substrate, adjusting one or more characteristics of a surface of the substrate, forming a catalytic center on the surface of the substrate, adjusting the activity of the catalytic center, and performing electroless plating on the surface of the substrate to form the metal layer. The first portion of the metal nanowire layer is located in the visible area, and the second portion of the metal nanowire layer and the metal layer are located in the periphery area. The patterning process includes using an etchant that may etch the metal layer and the metal nanowire layer to form the metal layer into a plurality of periphery lead wires and simultaneously form the second portion of the metal nanowire layer into a plurality of etching layers.

The disclosure provides a method for forming a touch panel, which includes providing a substrate, forming a metal layer, forming a metal nanowire layer, and performing a patterning process to form the metal nanowire layer into a touch sensing electrode located in a visible area and electrically connected to a periphery lead wire. The substrate includes a visible area and a periphery area. Forming the metal layer includes performing pre-treatment of the substrate, adjusting one or more characteristics of a surface of the substrate, forming a catalytic center on the surface of the substrate, adjusting the activity of the catalytic center, and performing electroless plating on the surface of the substrate to form the metal layer which includes a pattern and forms a plurality of periphery lead wires located in the periphery area.

The disclosure also provides a touch panel formed by the method described above.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
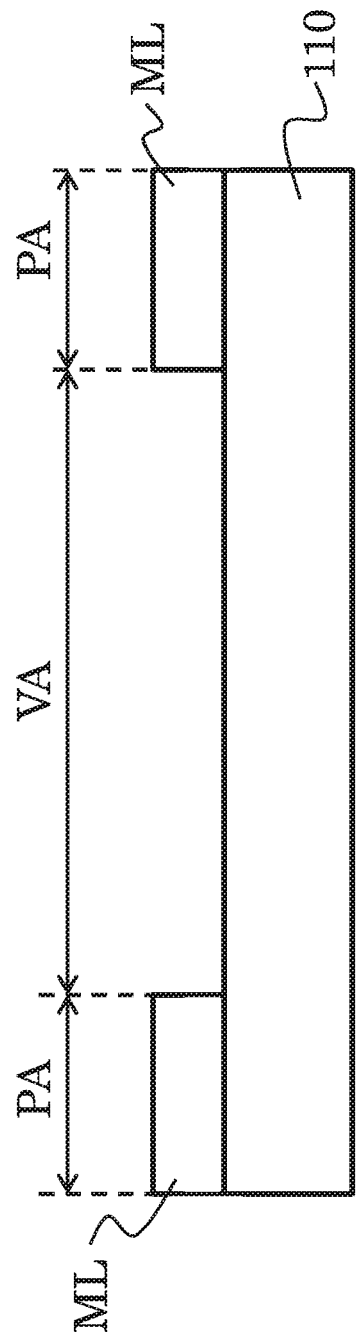
FIGS. 1A to 1C are schematic diagrams of a touch panel forming method according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

With regard to "about" or "approximately" used herein, the error or range of the value is generally within 20%, preferably within 10%, and more preferably within 5%. If it is not stated herein, the mentioned values are regarded as approximate values, that is, there are errors or ranges as indicated by "about" or "approximately".

Figure 9:
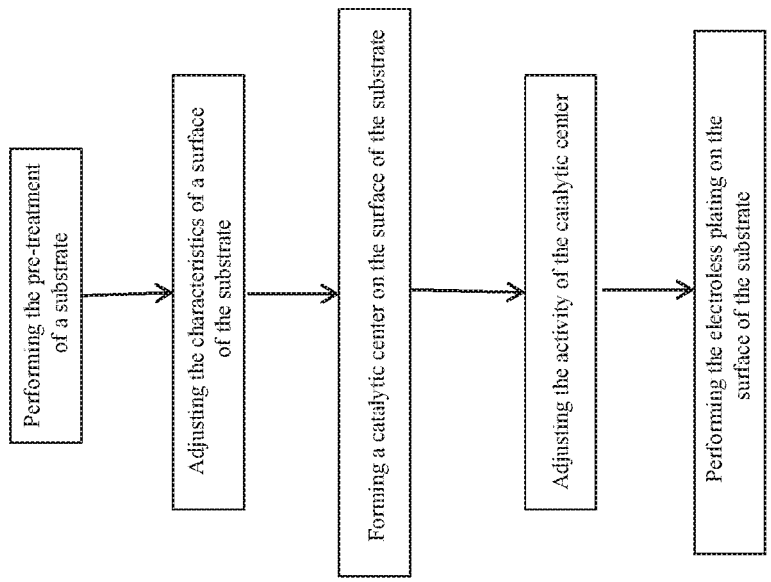
FIG. 9 is a schematic diagram of an electroless plating method according to the present disclosure.

Some embodiments of the present disclosure provide an electroless plating method, which may omit the catalytic layer of the traditional process. The steps include substrate pre-treatment, adjusting the characteristics of a surface of the substrate, forming a catalytic center on the surface of the substrate, adjusting the activity of the catalytic center, and performing the electroless plating on the surface of the substrate, as shown in FIG. 9. The specific elements of the above-mentioned method are as follows.

The substrate pre-treatment may include, but is not limited to, cleaning, degreasing, and roughening. The substrate is preferably a transparent substrate. In detail, the substrate may be a rigid transparent substrate or a flexible transparent substrate. The substrate may be selected from transparent materials, such as glass, polymethylmethacrylate (PMMA), polyvinyl chloride (PVC), polypropylene (PP), polyethylene terephthalate (PET), polyethylene naphthalate (PEN), polycarbonate (PC), polystyrene (PS), cyclo olefin polymer (COP), cyclo olefin copolymer (COC), and colorless polyimide (CPI). The pre-treatment step may use a weak base solution to achieve substrate surface cleaning or degreasing or may use hydrogen peroxide treatment to increase the substrate surface roughness. The pre-treatment step may further include a neutralization step, such as immersing the substrate in a weak acid solution to neutralize the weak base solution remaining on the substrate.

Adjusting the characteristics of a surface of the substrate may include, but is not limited to, adjusting the surface potential, surface tension, hydrophilicity (wettability), and the like. For example, an adjusting solution that includes at least cationic surfactants, metal ions, or the like is provided, such that the surface of the substrate is positively charged after the treatment of the adjusting solution. The treatment of the adjusting solution may also reduce surface tension and increase hydrophilicity. The adjusting solution mentioned above may be a weak base.

The formation of a catalytic center on the surface of the substrate may include, but is not limited to, providing a colloidal metal active solution, such as a colloidal palladium active solution that includes palladium chloride, hydrochloric acid, tin(II) chloride, potassium tetracyanopalladate, and/or additives. In another embodiment, the colloidal palladium active solution may be an acidic solution including HCl (100-500 ml/L), $SnCl_2$ (8-20 g/L), and $PdCl_2$ (0.01-1 g/L). The colloidal palladium active solution may include, for example, palladium (Pd), tin ions ($Sn^{2+}$), and chloride ions ($Cl^-$), which become palladium tin chloride compound (such as $Pd(SnCl_3)$) colloidal particles. The colloidal particles are stable in acidic solution, and the colloidal particles are about $10^{-1}$-$10^{-3}$ μm in size. When immersing a substrate in a colloidal palladium active solution, the substrate first adsorbs tin ions ($Sn^{2+}$) in the colloidal palladium active solution, and then adsorbs chloride ions ($Cl^-$) in the solution, or adsorbs chloride ions ($Cl^-$) in the solution by the positive charges on the surface of the substrate. Then a chloride adsorption film layer including tin and chloride is formed, and this film layer will adsorb colloidal palladium particles generated when preparing the solution. As a result, colloidal palladium particles are formed on the surface of the substrate. When certain conditions are reached, a redox reaction occurs, and a conductive metal elemental palladium is generated as a catalytic center. However, due to the colloid, the activity of the catalytic center (i.e., the metal elemental palladium) is affected, which is in a first active state with lower activity (lower reactivity). In one embodiment, a colloidal copper active solution or a mixed colloidal copper/palladium active solution may be used to make the catalytic center on the substrate surface. In another embodiment, the substrate may be immersed in a weak-acid catalyst, such as hydrochloric acid, which may provide chloride ions and an acidic environment to prevent excessive moisture and impurities from being carried into the aforementioned colloidal metal active solution. In one embodiment, the treatment condition of the substrate with the colloidal metal active solution may be room temperature (i.e., 18-24° C.), and the time may be, for example, 10 seconds, 30 seconds, 60 seconds, 2 minutes, 5 minutes, or 10 minutes.

Adjusting the activity of the catalytic center may include, but is not limited to, providing a solution which is able to remove the colloid (this step is also called a decollide step or an acceleration step). The solution reacts with the colloid, removes the chlorine and the tin, and exposes the catalytic center (such as metal elemental palladium). In other words, through the decollide process, the colloid (such as tin(II)) around the catalytic center (such as metal elemental palladium) is dissolved to expose the catalytic center with higher catalytic activity. The catalytic center is then in a second active state with higher activity (high reactivity).

The electroless plating on the surface of the substrate to form the electroless plating layer may include, but is not limited to, electroless copper plating, electroless nickel plating, electroless copper nickel plating, and the like. In one embodiment, the copper layer is deposited on the substrate surface by the electroless plating. In the case of no external current, the electroless plating uses a suitable reducing agent to reduce the metal ions in the plating solution into the metal plated on the surface by the metal catalyst. This process is called electroless plating, also known as chemical plating or autocatalytic plating. Specifically, for example, a plating solution which mainly includes copper sulfate may be used, and the composition of the plating solution may be, but is not limited to, copper sulfate with a concentration of 5 g/L, ethylenediaminetetraacetic acid with a concentration of 12 g/L, and formaldehyde with a concentration of 5 g/L. The pH of the electroless copper plating solution may be adjusted to about 11 to 13 with sodium hydroxide. The temperature of the plating bath may be about 50° C. to 70° C., and the immersion reaction time may be 1 to 5 minutes. During the electroless plating reaction, the copper material may nucleate on the catalytic center (such as metal elemental palladium), and then may continue to grow the copper film by the self-catalysis of copper. In one embodiment, the catalytic center (such as metal elemental palladium) acts as a catalyst in an electroless nickel plating solution to promote the generation of nickel.

In another embodiment, a catalytic center may be formed on a part of the surface of the substrate. For example, a partial area of the substrate surface may be masked first, and the exposed part may form the aforementioned catalytic center. In this way, the electroless plating layer will also be formed in the area with the catalytic center and include a specific pattern.

According to the above process, the embodiments of the present disclosure use catalyst-free chemical deposition (electroless plating) to solve the disadvantages caused by the requirement of a catalyst layer before the chemical deposition in the traditional process.

Figure 2A:
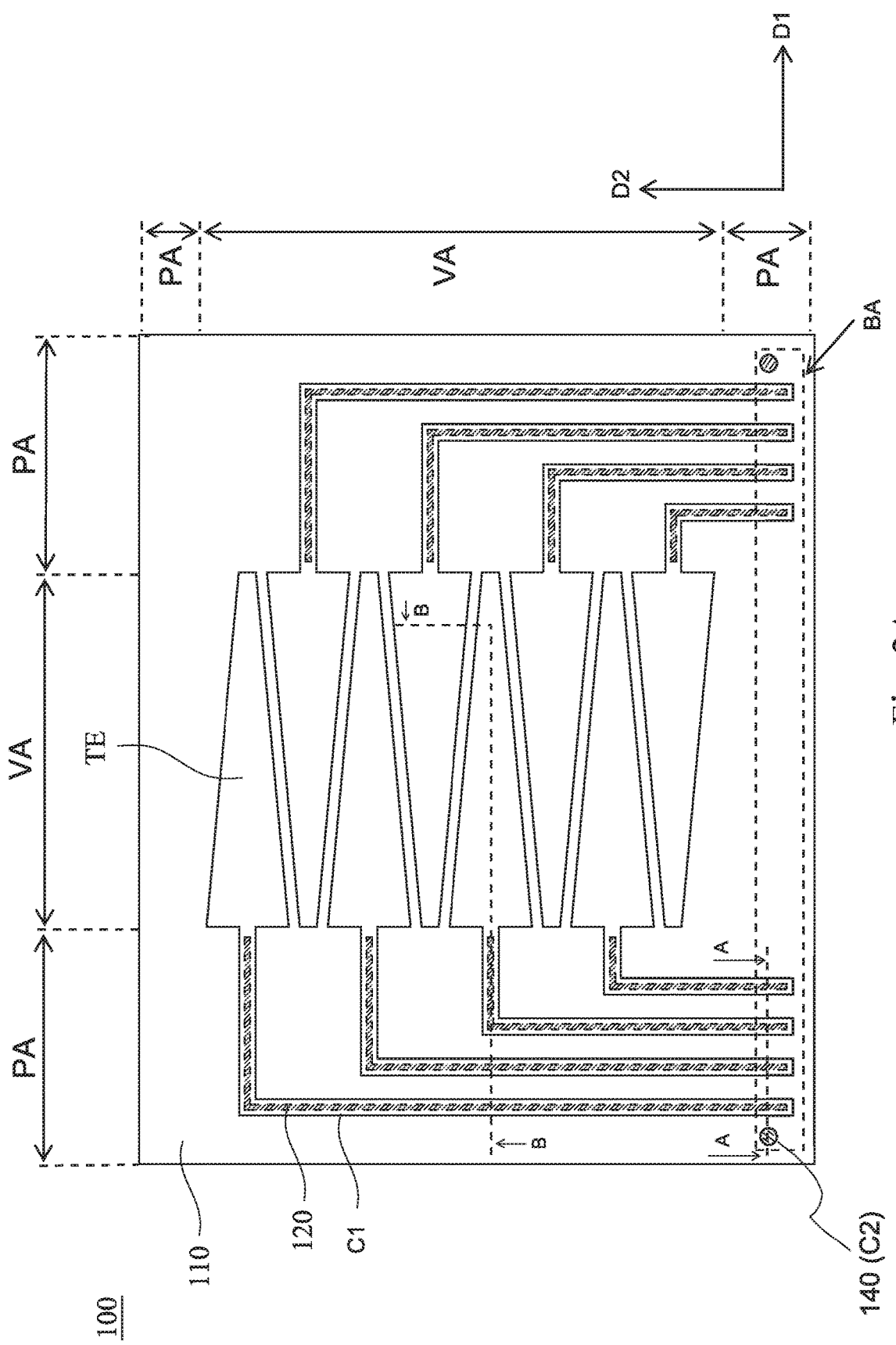
FIG. 2A is a schematic top view of a touch panel according to some embodiments of the present disclosure.
Figure 2B:
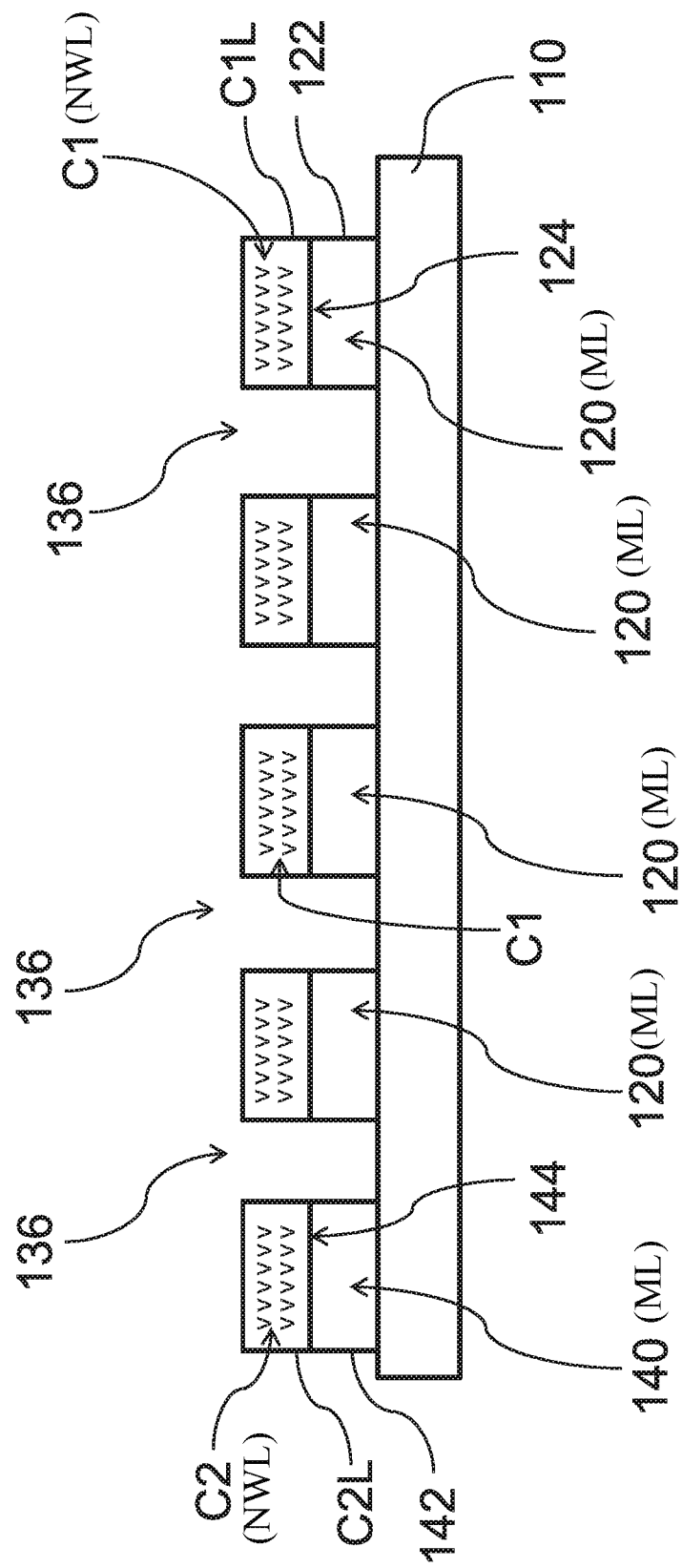
FIG. 2B is a schematic cross-sectional view along the line A-A of FIG. 2A.
Figure 2C:
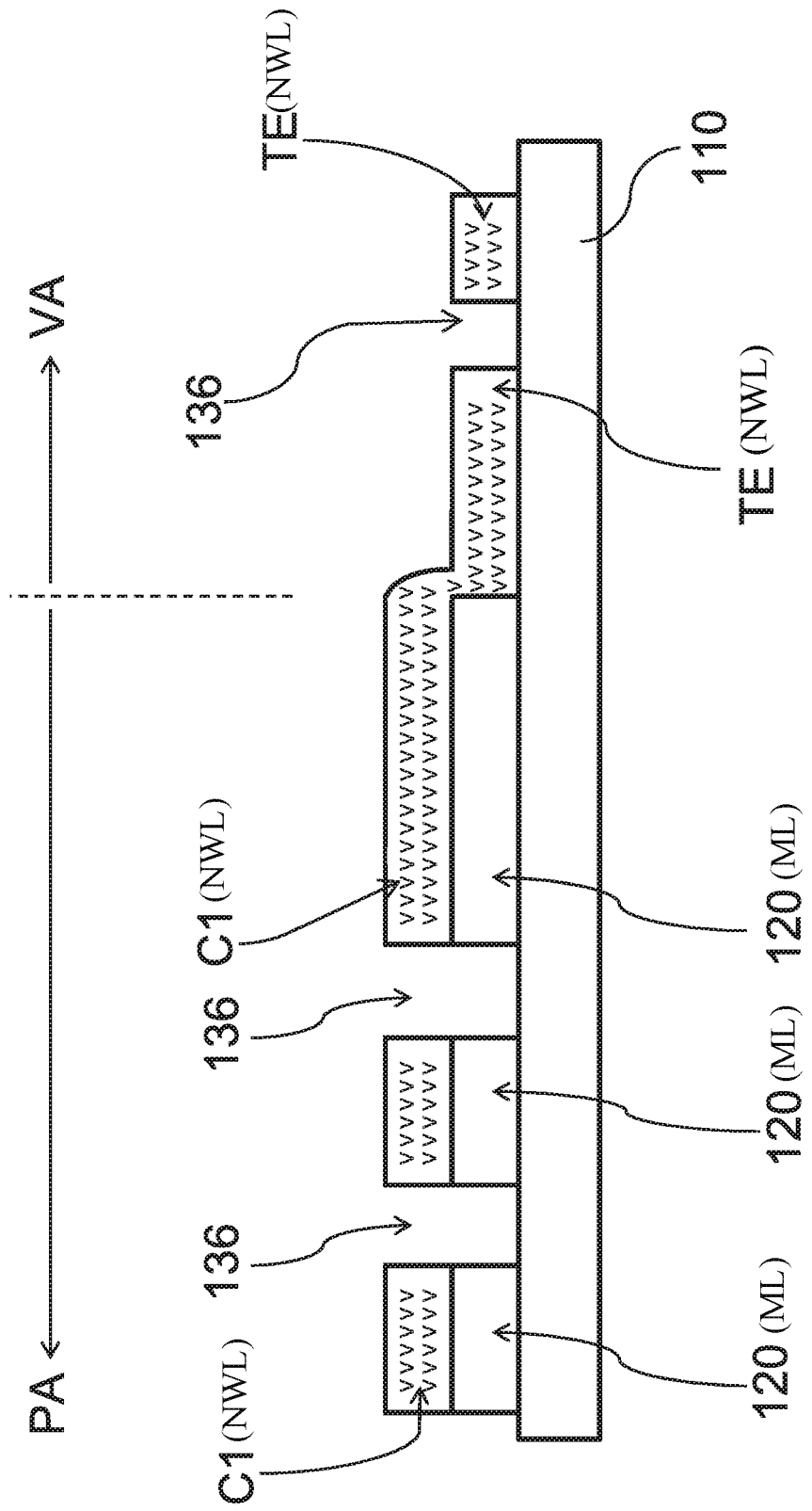
FIG. 2C is a schematic cross-sectional view along the line B-B of FIG. 2A.

Referring to FIG. 2A to FIG. 2C first, schematic top and cross-sectional views of a touch panel 100 are illustrated according to some embodiments of the present disclosure. The touch panel 100 includes a substrate 110, periphery lead wires 120, first covers C1, and touch sensing electrode TE. Referring to FIG. 2A, the substrate 110 includes a visible area VA and a periphery area PA. The periphery area PA is arranged on the side of the visible area VA. For example, the periphery area PA may be a frame arranged around the visible area VA (that is, covering the right, left, upper, and lower sides). In other embodiments, the periphery area PA may be an L-shaped area provided on the left and lower sides of the visible area VA. As shown in FIG. 2A, there may be a total of eight sets of the periphery lead wire 120 and the first cover C1 corresponding to the periphery lead wire 120 provided in the periphery area PA of the substrate 110. The touch sensing electrode TE is provided in the visible area VA of the substrate 110.

By providing the first cover C1 on a upper surface 124 of the periphery lead wire 120, the upper and lower layers of material may form the first cover C1 and the periphery lead wire 120 at a predetermined position without alignment, so that the requirement of the alignment error area can be reduced or avoided in the process. Therefore, the width of the periphery area PA may be reduced, thereby achieving the narrow border target of the display.

The touch panel 100 further includes a designation 140 and a second cover C2. Referring to FIG. 2A, there may be two sets of the designation 140 and the second cover C2 corresponding to the designation 140 disposed in the periphery area PA of the substrate 110. The aforementioned number of periphery lead wires 120, designations 140, first covers C1, second covers C2, and touch sensing electrodes TE may be one or more. The numbers drawn in the following specific embodiments and figures are for illustrative purposes only and do not limit the present disclosure.

Figure 1B:
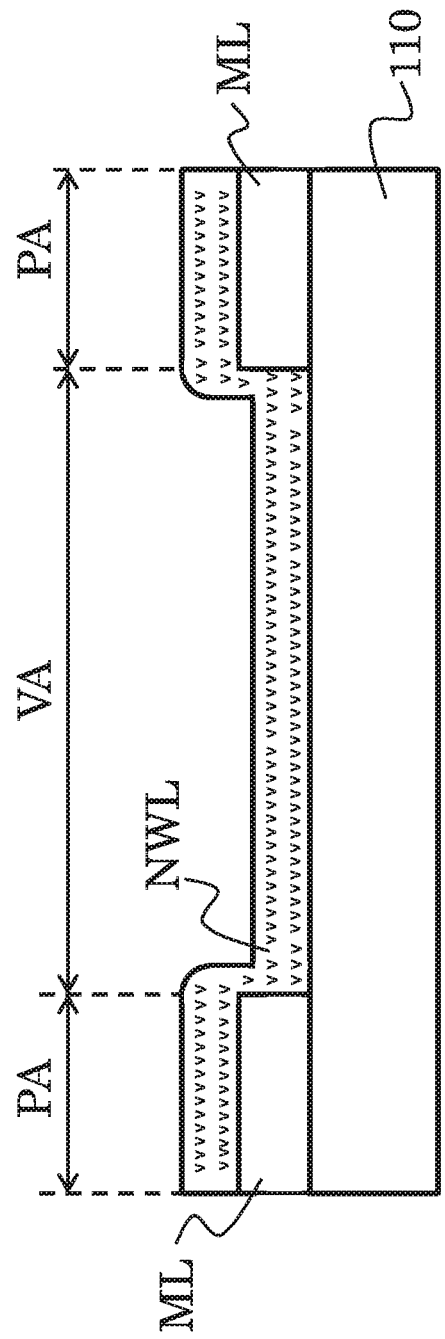
Figure 1C:
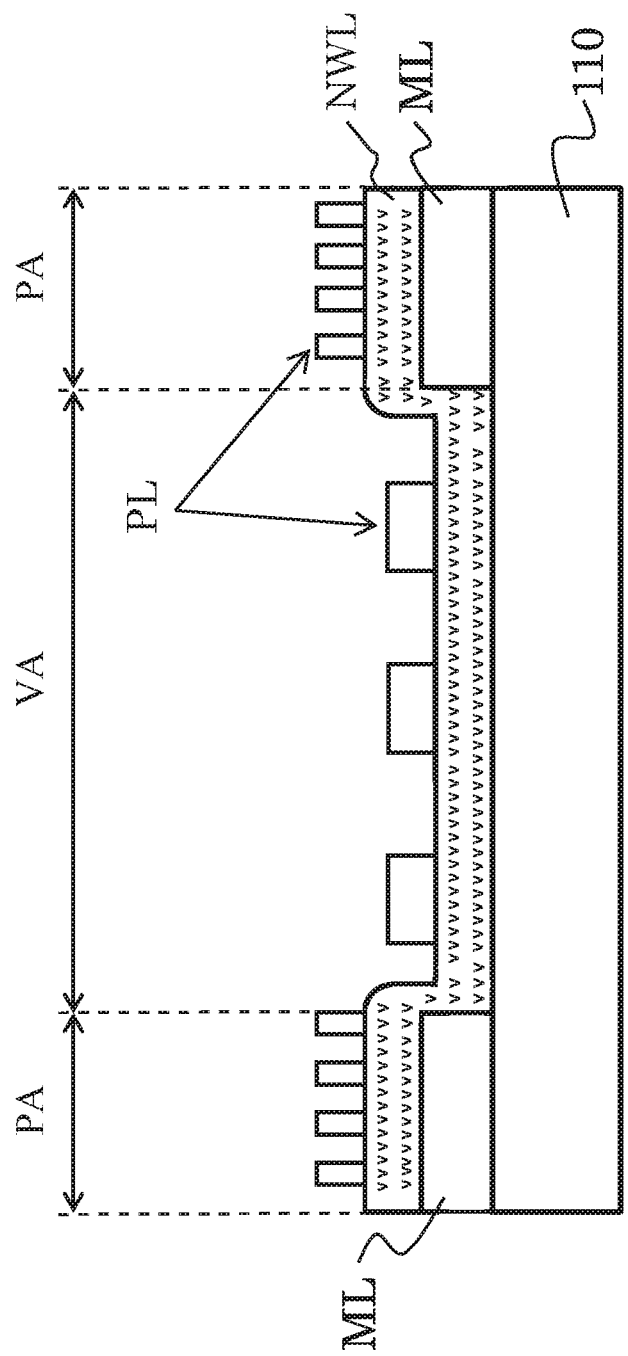

Specifically, referring to FIGS. 1A to 1C, the touch panel 100 may be manufactured by the following method in some embodiments of the present disclosure. First, a substrate 110 (also referring to the aforementioned substrate) is provided, which includes a predefined periphery area PA and visible area VA. A metal layer ML is then formed in the periphery area PA (as shown in FIG. 1A). A metal nanowire layer NWL is then formed in the periphery area PA and the visible area VA (as shown in FIG. 1B). Next, a patterned layer PL is formed on the metal nanowire layer NWL (as shown in FIG. 1C). Then a patterning step is performed using the patterned layer PL to form a patterned metal layer ML and a patterned metal nanowire layer NWL. This will be described in more details below.

Referring to FIG. 1A, the metal layer ML is formed in the periphery area PA of the substrate 110. The metal layer ML may be patterned subsequently to become a periphery lead wire. In detail, in some embodiments of the present disclosure, the metal layer ML may be a chemical deposition layer manufactured according to the aforementioned process.

In some embodiments, the metal layer ML may be directly and selectively formed in the periphery area PA instead of the visible area VA by the aforementioned processes of forming a catalytic center and electroless plating. The metal layer ML may also be formed as a continuous layer in the periphery area PA and the visible area VA first, and then the metal layer ML located in the visible area VA may be removed by etching or other steps. Alternatively, the catalytic center (such as metal elemental palladium) may be first formed in the periphery area PA with a specific pattern, and then the metal layer ML may be formed according to the pattern. In other words, the metal layer ML already has the strip pattern illustrated in FIG. 2A in the embodiments. In the following embodiments, the description takes the chemical copper layer selectively deposited on the periphery area PA (without pattern) of the substrate 110 for example.

Referring to FIG. 1B, a metal nanowire layer NWL including at least a metal nanowire, such as a silver nanowire layer, a gold nanowire layer, or a copper nanowire layer, is coated in the periphery area PA and the visible area VA. The first portion of the metal nanowire layer NWL is in the visible area VA. The first portion is mainly formed on the substrate 110, and the second portion in the periphery area PA is mainly formed on the metal layer ML. In some embodiment, the specific method is to coat a dispersion solution or an ink with metal nanowires on the substrate 110 and dry the metal nanowires to cover the surfaces of the substrate 110 and the metal layer ML, which further forms the metal nanowire layer NWL disposed on the substrate 110 and the metal layer ML. After the above-mentioned curing/drying step, the solvent and other substances are volatilized, and the metal nanowires are distributed on the surfaces of the substrate 110 and the metal layer ML in a random manner. Preferably, the metal nanowires are fixed on the surfaces of the substrate 110 and the metal layer ML without falling off, forming the metal nanowire layer NWL. The metal nanowires may contact each other to provide a continuous current path, thereby forming a conductive network.

In some embodiments of the present disclosure, the above-mentioned dispersion solution may be water, alcohol, ketone, ether, hydrocarbon, or aromatic solvent (such as benzene, toluene, or xylene). The above-mentioned dispersion solution may also include additives, surfactants, or adhesives, such as carboxymethyl cellulose (CMC), 2-hydroxyethyl cellulose (HEC), hydroxypropyl methylcellulose (HPMC), sulfonate, sulfate, disulfonate, sulfosuccinate, phosphate ester, or fluorine-containing surfactant. The dispersion solution or ink including metal nanowires may be formed on the surface of the substrate 110 and the metal layer ML in any manner, such as, but not limited to, screen printing, spray coating, roller coating, and other processes. In one embodiment, a roll-to-roll (RTR) process may be used to coat a dispersion solution or ink including metal nanowires onto the surfaces of continuously supplied substrate 110 and metal layer ML.

The "metal nanowires" herein is a collective term, which refers to a collection of metal wires including multiple elemental metals, metal alloys, or metal compounds (including metal oxides). The number of metal nanowires does not affect the protection scope claimed by the present disclosure. At least one cross-sectional dimension (i.e., the diameter of the cross-section) of a metal nanowire is less than about 500 nm, preferably less than about 100 nm, and more preferably less than about 50 nm. The metal nanostructures referred to as "wires" in the present disclosure mainly have a high aspect ratio, for example, between about 10 and 100,000. More specifically, the aspect ratio (length:diameter of the cross-section) may be greater than about 10, preferably greater than about 50, and more preferably greater than about 100. The metal nanowire may be any metal including, but not limited to, silver, gold, copper, nickel, and gold-plated silver. Other terms, such as silk, fiber, or tube (e.g., carbon nanotube), also having the above-mentioned dimensions and high aspect ratio are also within the scope of the disclosure.

Referring to FIG. 1C, a patterned layer PL is formed on the metal nanowire layer NWL. In one embodiment, the patterned layer PL may be formed by photolithography and etching processes using photoresist, dry film, and the like. In one embodiment, the patterned layer PL may be formed on the metal nanowire layer NWL with a patterned structure directly by a flexography technique. In detail, the patterned layer PL may be formed by relief printing, gravure printing, or screen printing, in which the material to be printed is transferred with a specific pattern onto the metal nanowire layer NWL. The patterned layer PL produced by the printing technology method may include a printed side surface that is different from the side surface formed by processing such as exposure development or etching. In one embodiment, after the material is printed onto the metal nanowire layer NWL, a curing step may be performed according to the material characteristics.

The patterned layer PL may be formed in the periphery area PA according to the aforementioned method and may also be formed in the periphery area PA and the visible area VA. The patterned layer PL located in periphery area PA (also called the second patterned layer) is regarded as an etching mask for the periphery area PA, which is used to pattern the metal nanowire layer NWL and metal layer ML in the periphery area PA in the following steps. The patterned layer PL located in the visible area VA (also called the first patterned layer) is regarded as an etching mask for the visible area VA, which is used to pattern the metal nanowire layer NWL in the visible area VA in the following steps.

The embodiments of the present disclosure do not limit the materials of the patterned layer PL (that is, the aforementioned materials to be printed). For example, the material may include polymer materials including various types of photoresist materials, undercoat materials, overcoat materials, protective layer materials, and insulating layer materials. The polymer materials may be phenolic resin, epoxy resin, acrylic resin, polyurethane (PU) resin, acrylonitrile butadiene styrene (ABS) resin, amino resin, silicone resin, and the like. In terms of material properties, the material of the patterned layer PL may be photo-curable or thermal-curable. In one embodiment, the material of the patterned layer PL has a viscosity of about 200 to 1500 cps and a solid content about 30 wt % to 100 wt %.

Then the patterning process is performed. After the patterning process, the touch panel 100 shown in FIG. 2A can be manufactured. In one embodiment, an etchant that can simultaneously etch the metal nanowire layer NWL and the metal layer ML is used in the periphery area PA with an etching mask formed by the patterned layer PL (also regarded as the second patterned layer) to produce the patterned metal layer ML and the metal nanowire layer NWL in one process. As shown in FIGS. 2A and 2C, the patterned metal layer ML formed in the periphery area PA is the periphery lead wire 120, and the patterned metal nanowire layer NWL constitutes the etching layer. Since the etching layer of the embodiment is located on the periphery lead wire 120, the etching layer may also be called the first cover C1. In other words, after the patterning process, the first cover C1, including the second portion of the metal nanowire layer NWL, and the periphery lead wire 120, including the metal layer ML, are formed in the periphery area PA.

In another embodiment, an etching layer, including the second portion of the metal nanowire layer NWL, and the periphery lead wire 120 with the designation 140, including the metal layer ML, may be formed in the periphery area PA (referring to FIGS. 2A, 2B, and 2C). The etching layer may then include the first cover C1 and the second cover C2, with the first cover C1 being disposed on the corresponding periphery lead wire 120 and the second cover C2 being disposed on the corresponding designation 140. In one embodiment, the metal nanowire layer NWL and the metal layer ML may be etched at the same time, which means that the ratio of the etching rates of the etching medium to the metal nanowire layer NWL and the metal layer ML is between about 0.1-10 or 0.01-100.

According to one specific embodiment, when the metal nanowire layer NWL is a silver nanowire layer, and the metal layer ML is a chemical copper layer, an etchant may be used to etch copper and silver. For example, the main component of the etchant is $H_3PO_4$ (about 55 wt % to 70 wt %) and $HNO_3$ (about 5 wt % to 15 wt %) to remove copper and silver materials in one process. In another specific embodiment, additives may be added to the main component of the etchant, such as an etching selectivity adjuster to adjust the rate of etching copper and silver. For example, about 5% to 10% benzotriazole (BTA) may be added into the main component of $H_3PO_4$ (about 55% to 70%) and $HNO_3$ (about 5% to 15%) to solve the problem of copper over-etching. In another specific embodiment, the main component of the etchant is ferric chloride/nitric acid or phosphoric acid/hydrogen peroxide.

The patterning step may further include simultaneously patterning the metal nanowire layer NWL in the visible area VA. In other words, as shown in FIG. 1C, the first portion of the metal nanowire layer NWL in the visible area VA may be patterned using the aforementioned etchant with the etching mask formed by the patterned layer PL (that is, the first patterned layer) to form the touch sensing electrode TE in the visible area VA. The touch sensing electrode TE may be electrically connected to the periphery lead wire 120. Specifically, the touch sensing electrode TE may also be a metal nanowire layer including at least a metal nanowire; that is, the patterned metal nanowire layer NWL forms the touch sensing electrode TE in the visible area VA and forms the first cover C1 in the periphery area PA. Therefore, the touch sensing electrode TE may contact the periphery lead wire 120 by the first cover C1 to achieve an electrical connection with the periphery lead wire 120 for signal transmission. The metal nanowire layer NWL may also form the second cover C2 on the upper surface 144 of the designation 140 in the periphery area PA. The designation 140 may be widely interpreted as a pattern of non-electrical functions, but the designation 140 is not limited to this. In some embodiments of the present disclosure, the periphery lead wire 120 and the designation 140 may be formed of the same metal layer ML (that is, the two are the same metal material, such as the chemical copper plating layer formed with the catalytic center). The touch sensing electrode TE, the first cover C1, and the second cover C2 may be formed of the same metal nanowire layer NWL.

In one embodiment, the metal nanowire layer NWL located in the visible area VA and the periphery area PA may be patterned by different etching steps (i.e. using different etchants). For example, in the case that the metal nanowire layer NWL is a silver nanowire layer and the metal layer ML is an electroless copper plating layer, the etchant used in the visible area VA may be an etchant for etching silver but not copper. In other words, the etching rate of the etchant for silver is about 100 times, about 1000 times, or about 10,000 times greater than the copper etching rate.

According to one specific embodiment, the patterned layer PL may be selected from materials that can remain in the structure. In other words, the patterned layer PL will not be removed after the above-mentioned etching steps. For example, the patterned layer PL may be a photo-curable material with high light transmittance, low dielectric constant, and low haze to maintain the transmittance of the touch sensing electrode TE in the visible area VA between about 88% and 94%, the haze ratio between about 0-2, and the surface resistance between about 10-150 ohm/square. The above-mentioned photoelectric characteristics of the patterned layer PL make the combination of the patterned layer PL and the metal nanowire layer NWL meet the optical and touch sensing requirements in the visible area VA. In one embodiment, a curing step (such as ultraviolet (UV) curing) may be further included. After curing, the touch sensing electrode TE and the patterned layer PL in the visible area VA may form a composite structure with higher electrical conductivity and light transmittance. For example, the transmittance of visible light (e.g., wavelength between about 400 nm and 700 nm) of the composite structure may be greater than about 80%, and the surface resistance may be about 10 to 1000 ohm/square. Preferably, the transmittance of visible light (for example, wavelength between about 400 nm and 700 nm) of the composite structure may be greater than about 85%, and the surface resistance may be between about 50 and 500 ohm/square.

According to one specific embodiment, the patterned layer PL may be removed. Furthermore, after removing the patterned layer PL, a film layer may be coated. The film layer may form a composite structure with the metal nanowire layer NWL (such as the first cover C1, the second cover C2, or the touch sensing electrode TE), and the composite structure may have certain specific chemical, mechanical, and optical properties, such as providing adhesion between the substrate 110 and the touch sensing electrode TE, the first cover C1, or the second cover C2, or providing better physical mechanical strength. Thus, the film layer can also be called a matrix. On the other hand, some specific polymers may be used to make the film layer, so that the touch sensing electrode TE, the first cover C1, and the second cover C2 have additional surface protection against scratches and abrasion. In this case, the film layer can also be called an overcoat. The materials of the film layer, such as polyacrylate, epoxy resin, polyurethane, polysilane, polysiloxane, poly(silicon-acrylic acid), or the like, can enable the touch sensing electrode TE, the first cover C1, and the second cover C2 to have higher surface strength and improved scratch resistance. However, the aforementioned features are only possible additional functions/names of the film layer and are not intended to limit the present disclosure. It should be noted that the polymer used to make the film layer may penetrate between the metal nanowires before being cured or in the pre-cured state to form a filler. When the polymer is cured, the metal nanowires will be embedded in the film layer. In other words, the present disclosure is not intended to limit the structure between the film layer and the metal nanowire layer NWL (such as the first cover C1, the second cover C2, or the touch sensing electrode TE) which may be a layered structure, an embedded structure, or a combination thereof. The film layer may also be formed before the patterning process.

FIG. 2A shows a schematic top view of the touch panel 100 according to one embodiment of the present disclosure. FIGS. 2B and 2C are the cross-sectional views among line A-A and line B-B of FIG. 2A, respectively. Referring to FIG. 2B first, as shown in FIG. 2B, the periphery lead wire 120 and the designation 140 are disposed in the periphery area PA. The first cover C1 and the second cover C2 respectively cover the upper surface 124 of the periphery lead wire 120 and the upper surface 144 of the designation 140. In some embodiments of the present disclosure, the metal nanowire may be a silver nanowire. For the convenience of explanation, the cross-sections of the periphery lead wire 120 and the designation 140 herein are quadrilateral (such as the rectangles drawn in FIG. 2B), but the structures or the numbers of side surfaces 122 and upper surfaces 124 of the periphery lead wire 120 and side surfaces 142 and upper surfaces 144 of the designation 140 may be changed according to the actual application, which is not limited by the description and figures herein.

In the embodiment, the designation 140 is disposed in a junction BA (as shown in FIG. 2A) in the periphery area PA, which is an alignment designation. In other words, the designation 140 is the mark that aligns a flexible circuit board and the touch panel 100 in a connecting step (regarded as a bonding step) between the external circuit board (such as the flexible circuit board 170 shown in FIG. 3) and the touch panel 100. However, the present disclosure does not limit the placement or function of the designation 140. For example, the designation 140 may be any inspection mark, pattern, or reference design required in the process, which are all protected by the present disclosure. The designation 140 may include any possible shape, such as a circle, a quadrangle, a cross, an L-shape, a T-shape, or the like. On the other hand, the portion of the periphery lead wire 120 that extends into the junction BA can also be called a bonding section. As in the previous embodiment, the upper surface of the bonding section in the junction BA is also covered by the first cover C1.

As shown in FIGS. 2B and 2C, there is a non-conductive area 136 between the adjacent periphery lead wires 120 in the periphery area PA to electrically isolate the adjacent periphery lead wires 120 to avoid short circuit. That is to say, there is a non-conductive area 136 between the side surfaces 122 of the adjacent periphery lead wires 120, and in this embodiment, the non-conductive area 136 is a gap to isolate the adjacent periphery lead wires 120. The above-mentioned gap may be formed by etching with the patterned layer PL. Therefore, the side surface 122 of the periphery lead wire 120 and the side surface C1L of the first cover C1 are a simultaneously etched surface and are aligned with each other. In other words, regarding the side surface of the patterned layer PL as a reference, the side surface 122 of the periphery lead wire 120 and the side surface C1L of the first cover C1 are formed according to the side surface of the patterned layer PL in one etching step. Similarly, the side surface 142 of the designation 140 and the side surface C2L of the second cover C2 are a simultaneously etched surface and are aligned with each other. In one embodiment, the side surface C1L of the first cover C1 and the side surface C2L of the second cover C2 may not include the metal nanowires on them due to the above-mentioned etching step. Furthermore, the periphery lead wire 120 and the first cover C1 may have the same or similar patterns and sizes, such as long-straight patterns with the same or similar widths. The designation 140 and the second cover C2 may also have the same or similar patterns and sizes, such as circles with the same or similar radius, quadrilaterals with the same or similar side length, or other same or similar crosses, L-shaped, T-shaped patterns.

As shown in FIG. 2C, there may be a non-conductive area 136 between the adjacent touch sensing electrodes TE in the visible area VA to electrically isolate the adjacent touch sensing electrodes TE to avoid short circuit. That is to say, there may be a non-conductive area 136 between the side walls of the adjacent touch sensing electrodes TE. In this embodiment, the non-conductive area 136 is a gap to isolate the adjacent touch sensing electrodes TE. In one embodiment, the above-mentioned etching method may be used to form a gap between the adjacent touch sensing electrodes TE. In the embodiment, the touch sensing electrode TE and the first cover C1 may be formed of the same metal nanowire layer NWL (such as a silver nanowire layer), so that the metal nanowire layer NWL may form a climbing structure at the junction between the visible area VA and the periphery area PA. The climbing structure leads to the metal nanowire layer NWL formed on and covering the upper surface 124 of the periphery lead wire 120, which becomes the first cover C1.

In some embodiments of the present disclosure, the first cover C1 of the touch panel 100 may be disposed on the upper surface 124 of the periphery lead wire 120. The first cover C1 and the periphery lead wire 120 may be formed in one etching process, so that the alignment error area can be reduced or avoided in the process, and the width of the periphery area PA can be reduced to meet the requirement of the narrow border of the display. Specifically, the width of the periphery lead wire 120 of the touch panel 100 in some embodiments of the present disclosure is about 5 μm to 30 μm, and the distance between adjacent periphery lead wires 120 is about 5 μm to 30 μm. Alternately, the width of the periphery lead wire 120 of the touch panel 100 is about 3 μm to 20 μm, and the distance between the adjacent periphery lead wires 120 is about 3 μm to 20 μm. The width of the periphery area PA may also reach a size less than 2 mm, and thus the frame size is reduced by about 20% or more compared to traditional touch panels.

In some embodiments of the present disclosure, the touch panel 100 further includes a second cover C2 and a designation 140. The second cover C2 is disposed on the upper surface 144 of the designation 140, and the second cover C2 and the designation 140 are formed in one etching process.

Figure 3:
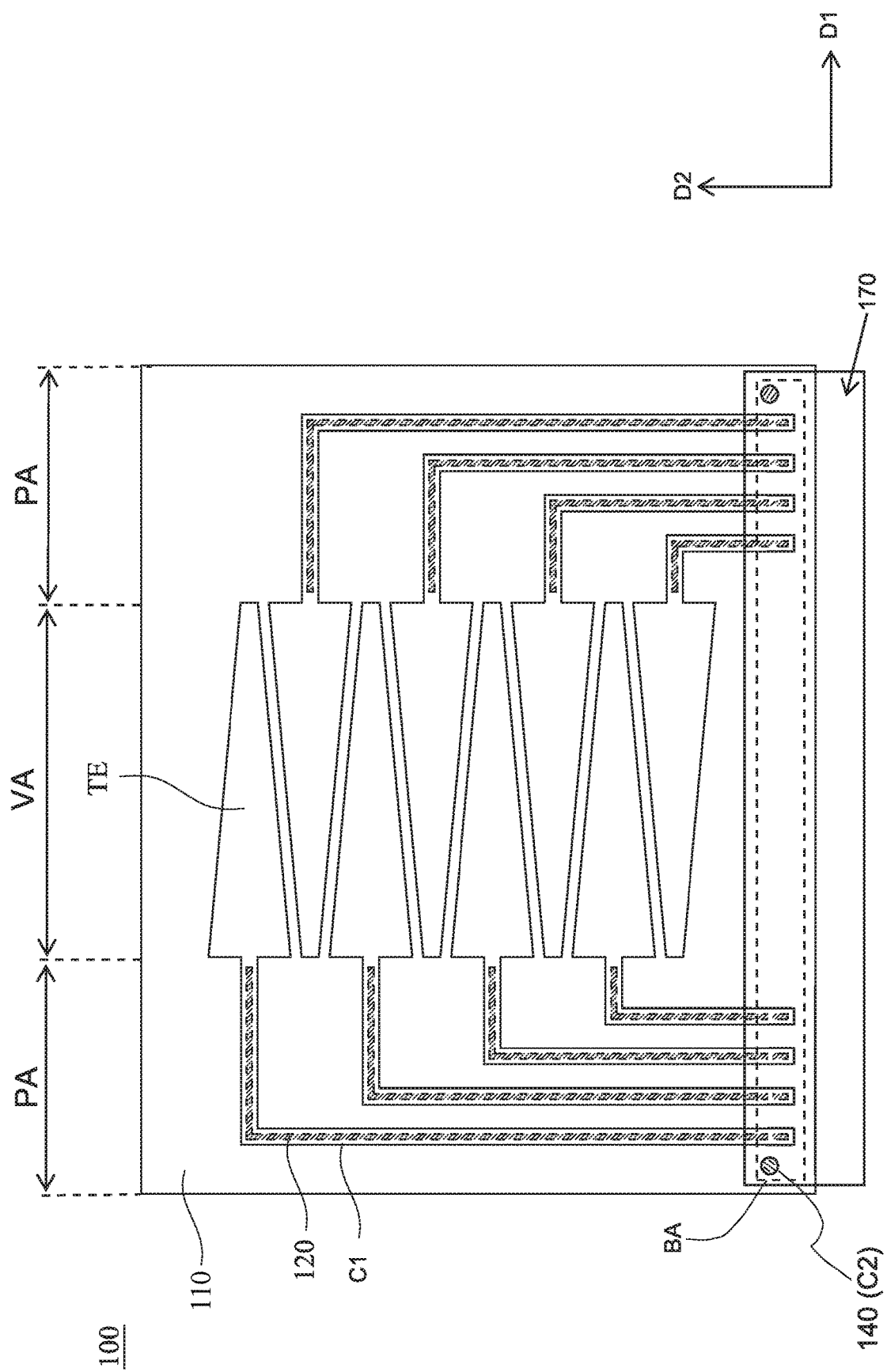
FIG. 3 is a schematic top view of a touch panel and a flexible circuit board after being assembled according to some embodiments of the present disclosure.

FIG. 3 shows the assembly structure after the flexible circuit board 170 and the touch panel 100 are aligned, in which the electrode pads (not shown) of the flexible circuit board 170 may be electrically connected to the periphery lead wire 120 in the junction BA located on the substrate 110 by conductive adhesives (not shown, such as anisotropic conductive adhesive). In some embodiments, the first cover C1 located in the junction BA may include an opening (not shown) to expose the periphery lead wire 120, and the conductive adhesives (such as anisotropic conductive adhesive) may be filled into the opening of the first cover C1 to directly contact the periphery lead wire 120 and form a conductive path. In the embodiment, the touch sensing electrodes TE may be arranged in a non-staggered arrangement. For example, the touch sensing electrode TE may be a strip electrode that extends along the first direction D1 and includes a width change in the second direction D2, which does not interlace with other touch sensing electrodes TE. However, in other embodiments, the touch sensing electrode TE may include any appropriate shape and should not limit the scope of the present disclosure. In the embodiment, the touch sensing electrode TE includes a single-layer configuration, in which the touch position can be obtained by detecting the change of the capacitance value of each touch sensing electrode TE. Furthermore, the patterned layer PL and the touch sensing electrode TE may include the same or similar patterns and sizes, such as the above-mentioned strip electrodes that extend along the first direction D1 and include a width change in the second direction D2 with the same or similar sizes.

Figure 4:
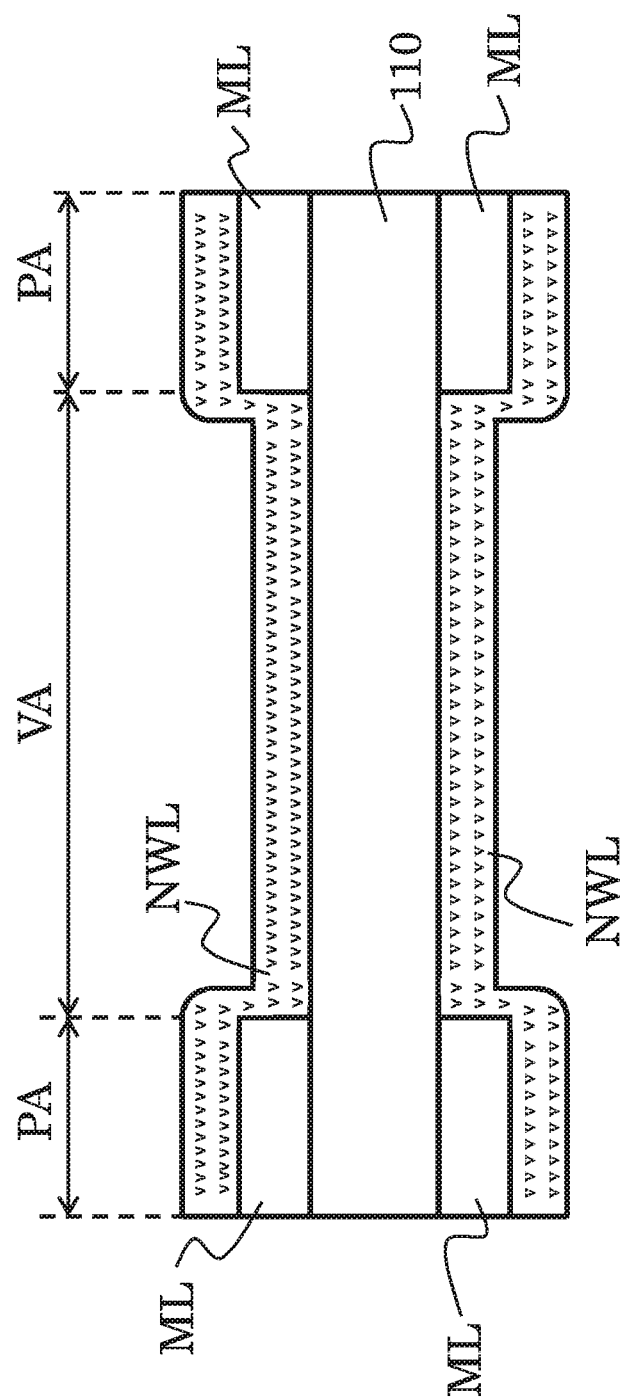
FIG. 4 is a schematic diagram of a touch panel according to another embodiment of the present disclosure.

In the present disclosure, the above-mentioned method may also be applied to both sides of the substrate 110 to produce a double-sided touch panel 100, which may be formed, for example, by the following method. First, a substrate 110 is provided, as shown in FIG. 4, which includes a predefined periphery area PA and a visible area VA. Then the metal layers ML are formed on the first and second surfaces on opposite sides (such as the upper surface and the lower surface) of the substrate 110 by using the aforementioned catalytic center with the electroless plating process. The metal layers ML are located in the periphery area PA. The metal nanowire layers NWL are then formed in the periphery area PA and the visible area VA on the first and second surfaces. The patterned layers PL are then formed on the metal nanowire layers NWL on the first and second surfaces. The patterning process is then performed on the first and second surfaces with the patterned layers PL to form the above-mentioned touch sensing electrodes TE and periphery lead wires 120 on the first and second surfaces, in which the first covers C1 may cover the periphery lead wires 120, as shown in FIG. 4. Since the process related to the catalytic center (such as palladium colloid) is directly performed on both sides of the substrate and cooperates with the chemical deposition of metal in the embodiment, it is beneficial to simplify the process and improve the yield. For the specific implementation of this embodiment, reference may be made to the foregoing, and details are not provided herein again.

According to some embodiments of the present disclosure, another double-sided touch panel is provided, and the touch panel may be formed by stacking two sets of single-sided touch panels in the same direction or in opposite directions. Taking the stacking in which the two sets of single-sided touch panels are stacked in opposite directions as an example, the touch sensing electrodes of the first group of single-sided touch panel may be arranged upward (for example, closest to the user, but not limited to this). The touch sensing electrodes of the second group of single-sided touch panels may be arranged downward (for example, furthest from the user, but not limited to this). The two groups of touch panel substrates are assembled and fixed with optical glue or other similar adhesives to form a double-sided touch panel.

Figure 5A:
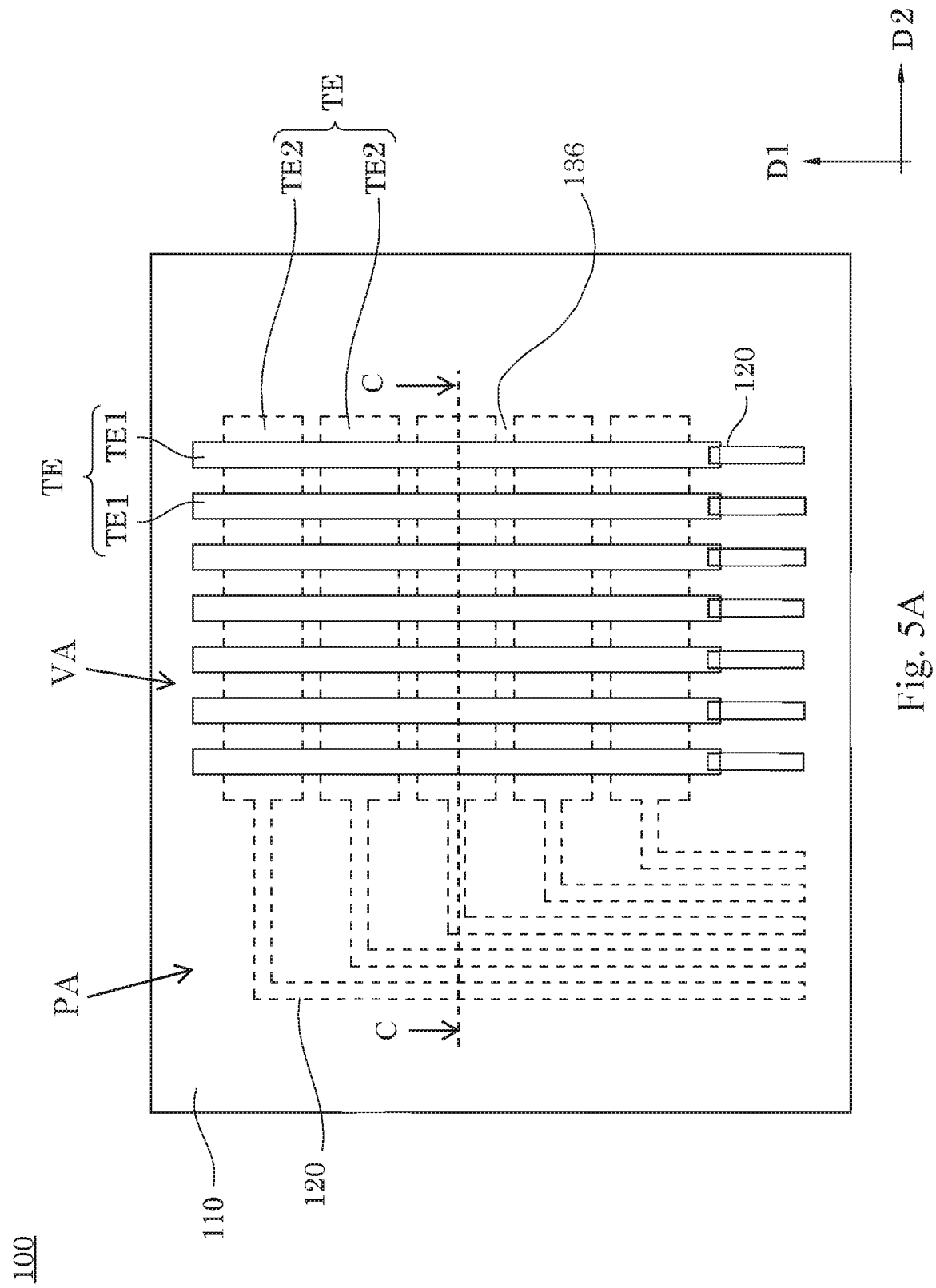
FIG. 5A is a schematic top view of a touch panel according to another embodiment of the present disclosure.

FIG. 5A illustrates a touch panel 100 according to one embodiment of the present disclosure, which includes a substrate 110, touch sensing electrodes TE (i.e., the first touch sensing electrode TE1 and the second touch sensing electrode TE2 formed by the metal nanowire layer NWL) formed on the upper and lower surfaces of the substrate 110, and periphery lead wires 120 formed on the upper and lower surfaces of the substrate 110. For simplicity, the first covers C1 and the second covers C2 are not shown in FIG. 5A. Viewing from the upper surface of the substrate 110, the first touch sensing electrode TE1 in the visible area VA and the periphery lead wire 120 in the periphery area PA may be electrically connected to each other for signal transmission. Similarly, viewing from the lower surface of the substrate 110, the second touch sensing electrode TE2 in the visible area VA and the periphery lead wire 120 in the periphery area PA may be electrically connected to each other for signal transmission. In addition, as in the previous embodiment, the touch panel 100 may further include a designation 140 (not labeled) and a second cover C2 corresponding to the designation 140 disposed in the periphery area PA of the substrate 110.

Figure 5B:
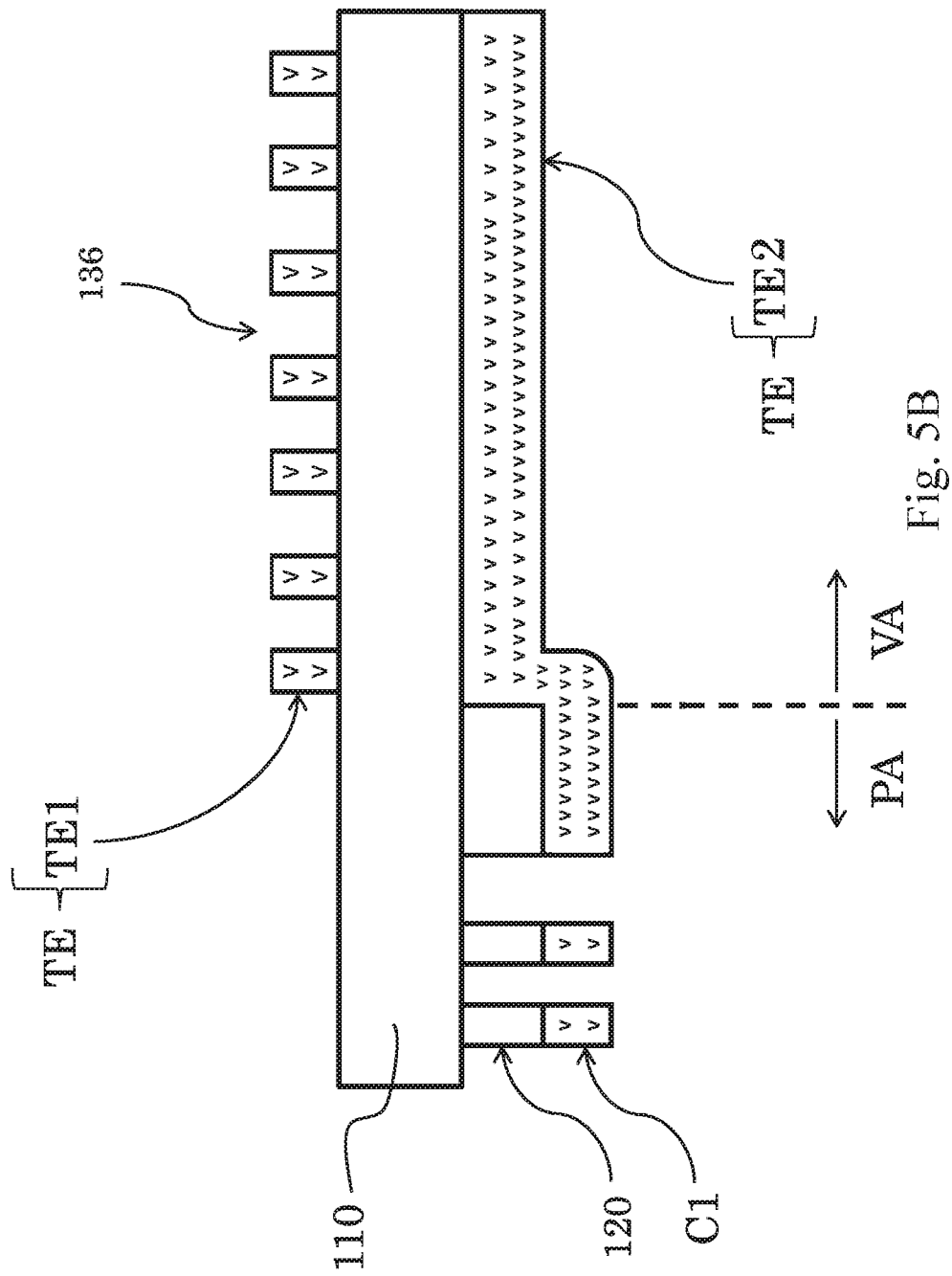
FIG. 5B is a schematic cross-sectional view along the line C-C of FIG. 5A.

Referring to FIG. 5A and the cross-sectional view along line C-C of FIG. 5A shown in FIG. 5B, the first touch sensing electrode TE1 is approximately located in the visible area VA, which may include a plurality of strip-shaped touch sensing electrode extending in one direction (such as the first direction D1). The area removed by etching may be defined as a non-conductive area 136 to electrically isolate adjacent first touch sensing electrodes TE1. The first touch sensing electrode TE1 and the second touch sensing electrode TE2 interlace with each other, and the first touch sensing electrode TE1 and the second touch sensing electrode TE2 may constitute the touch sensing electrode TE to detect the touch or the gesture.

Figure 6:
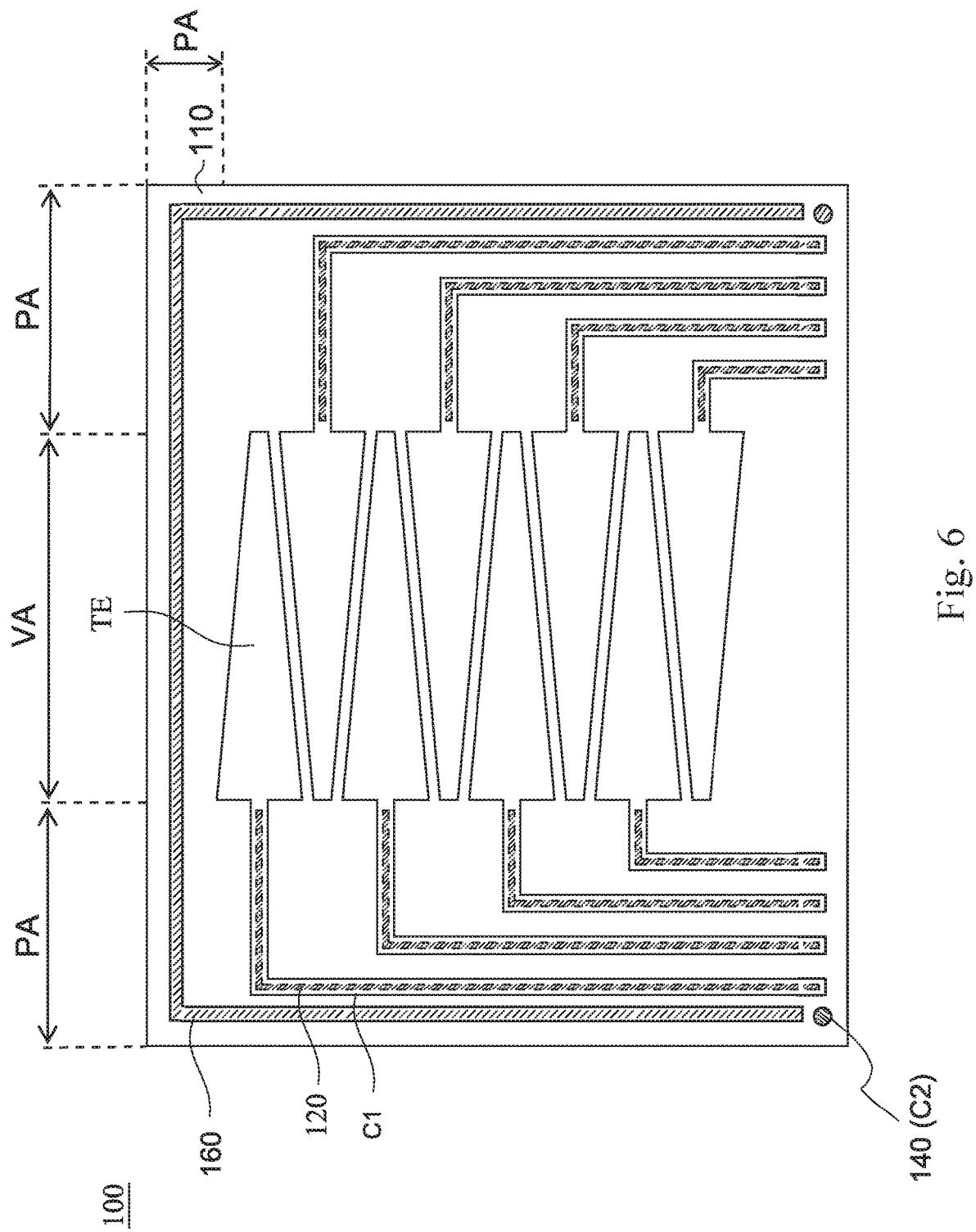
FIG. 6 is a schematic top view of a touch panel according to another embodiment of the present disclosure.

FIG. 6 is a schematic top view of the touch panel 100 according to some embodiments of the present disclosure. The embodiment is similar to the previous embodiment, with the main difference being that the touch panel 100 may further include a mask wire 160 disposed in the periphery area PA. The mask wire 160 mainly surrounds the touch sensing electrode TE and the periphery lead wire 120, and the mask wire 160 extends to the junction BA (as shown in FIG. 2A) to electrically connect to ground on the flexible circuit board. Therefore, the mask wire 160 can mask or eliminate signal interference or provide electrostatic discharge (ESD) protection, especially due to small current changes caused by human hands touching the connecting wires around the touch device.

According to the aforementioned method, the mask wire 160 and the periphery lead wire 120 may be formed of the same metal layer ML (that is, the mask wire 160 and the periphery lead wire 120 are made of the same metal material, such as the aforementioned electroless copper plating layer). The metal nanowire layer NWL (also regarded as a third cover layer) may be above the mask wire 160, and the mask wire 160 may be formed after etching with the pattern of the patterned layer PL. It can also be understood that the mask wire 160 includes a composite structure layer including the metal nanowire layer NWL and the metal layer ML. For additional details, reference may be made to the description corresponding to FIG. 2B and FIG. 2C.

Figure 7:
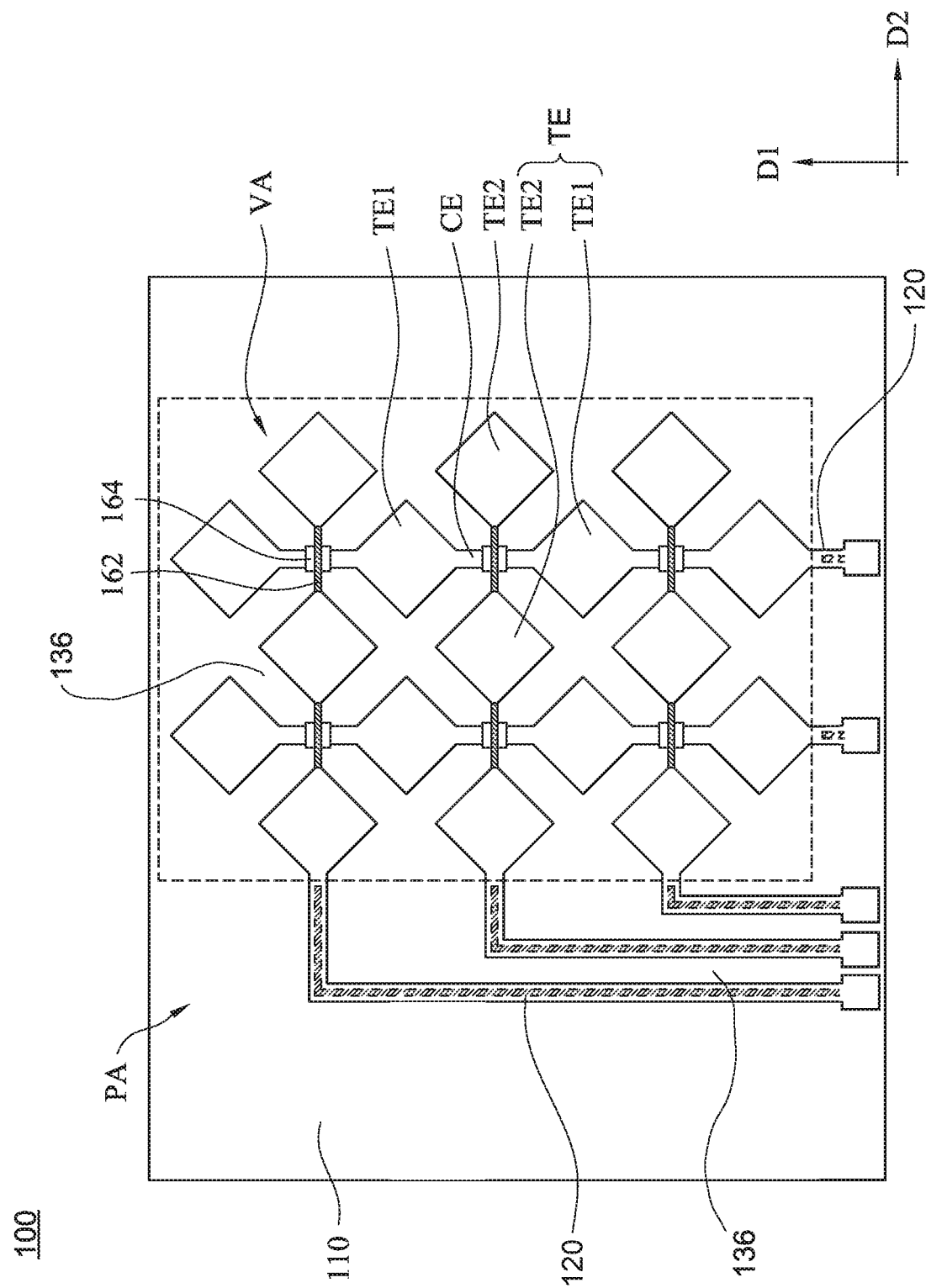
FIG. 7 is a schematic top view of a touch panel according to another embodiment of the present disclosure.

FIG. 7 shows another embodiment of the single-sided touch panel 100 of the present disclosure, which is a single-sided bridge touch panel. The difference between the embodiment and the above-mentioned embodiments are at least, that after the patterning step, the transparent conductive layer (i.e. the metal nanowire layer NWL) formed on the substrate 110 may form the touch sensing electrode TE including the first touch sensing electrode TE1 arranged along the first direction D1, the second touch sensing electrode TE2 arranged along the first direction D2, and a connecting electrode CE electrically connecting two adjacent first touch sensing electrode TE1. In addition, an insulation block 164, for example, made of silicon dioxide, may be disposed on the connecting electrode CE. A bridge wire 162, for example, a bridge wire formed of copper/ITO/metal nanowire, is then disposed on the insulation block 164, and the bridge wire 162 is connected to two adjacent second touch sensing electrodes TE2 along the second direction D2. The insulation block 164 may be located between the connecting electrode CE and the bridge wire 162 to electrically isolate the connecting electrode CE and the bridge wire 162, which electrically isolates the touch sensing electrodes along the first direction D1 and the second direction D2 from each other. The specific method is similar to that described above and will not be repeated herein. Similar to the above embodiments, the periphery lead wire 120 may be formed by a metal layer ML (such as the aforementioned electroless copper plating layer) with a metal nanowire layer NWL on it, and the periphery lead wire 120 may connect to the first touch sensing electrode TE1 and the second touch sensing electrode TE2.

Figure 8:
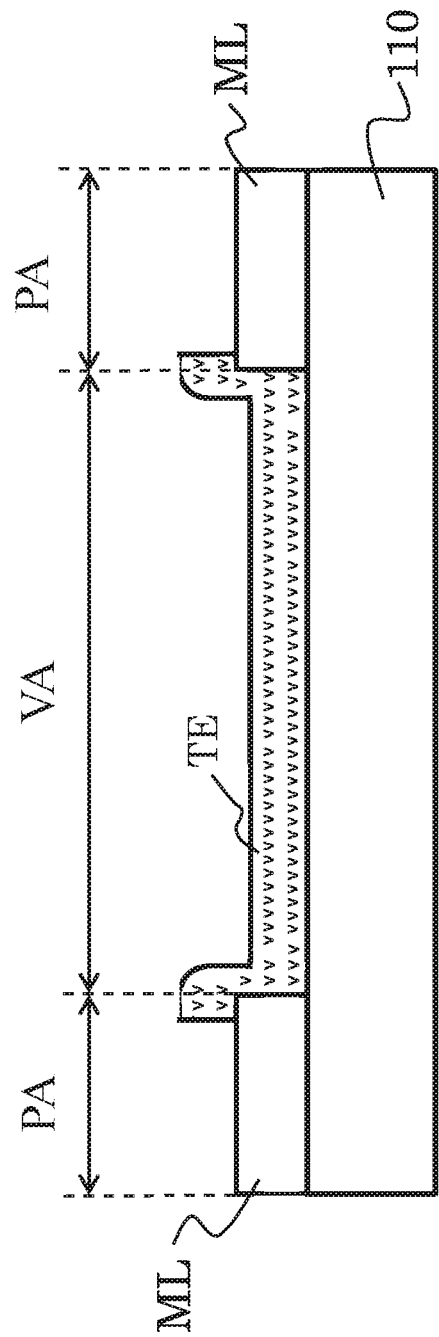
FIG. 8 is a schematic diagram of a touch panel according to another embodiment of the present disclosure.

FIG. 8 shows another embodiment of the touch panel 100 of the present disclosure, in which the metal layer ML (i.e., electroless copper plating layer) is directly and selectively formed in the periphery area PA by using the aforementioned process, and the metal layer ML is formed into peripheral circuits and/or designations through etching and other steps. Then, the touch sensing electrode TE may be formed by the metal nanowire layer NWL in the visible area VA. The touch sensing electrode TE climbs on the surrounding lines near the junction of the visible area VA and the periphery area PA to form an electrical connection. However, the peripheral lines and/or designations located in the periphery area PA generally do not include metal nanowire material.

The touch panel of the embodiments of the present disclosure may be assembled with other electronic devices, such as a display with a touch function. For example, the substrate 110 may be attached to a display element, such as a liquid crystal display element or an organic light-emitting diode (OLED) display element, by optical glue or other similar adhesives. The touch sensing electrode TE may also be attached to an outer cover layer (such as protective glass) by using optical glue. The touch panel of the embodiments of the present disclosure can be applied to electronic devices such as portable phones, tablet computers, notebook computers, and the like.

In some embodiments, the touch panel 100 described herein may be manufactured by a roll-to-roll process. The roll-to-roll process uses traditional equipment and can be fully automated, which can significantly reduce the cost of manufacturing touch panels. The specific method of the roll-to-roll process (also referred to as roll-to-roll coating) is as follows. First, the flexible substrate 110 is selected, and the flexible substrate 110 is installed between the two rollers. A motor to drive the roller is used, so that a continuous process may be performed to the substrate 110 along the moving path between the two rollers. For example, a plating tank is used to deposit the metal layer ML. A storage tank, spray device, brush coating device, and the like are used to deposit the metal nanowire-containing ink on the surface of the substrate 110, and a curing step is applied to form the metal nanowire layer NWL. Then the patterned layer PL is formed (for example, using the aforementioned flexographic printing method) on the metal layer ML and/or the metal nanowire layer NWL. Then the patterning and other steps are performed by an etching bath or etchant spray. Subsequently, the completed touch panel 100 is rolled out by a roller at the end of the production line to form a touch sensor tape.

The touch sensor tape of this embodiment may further include a film layer which comprehensively covers the uncut touch panel 100 on the touch sensor roll. The film layer may cover the uncut touch panel 100 on the touch sensor roll, and the two may be separated into individual touch panels 100.

In some embodiments of the present disclosure, the substrate 110 preferably includes a transparent substrate. In detail, the substrate 110 may include a rigid transparent substrate or a flexible transparent substrate. The material may be selected from transparent materials, such as glass, polymethylmethacrylate (PMMA), polyvinyl chloride (PVC), polypropylene (PP), polyethylene terephthalate (PET), polyethylene naphthalate (PEN), polycarbonate (PC), polystyrene (PS), cycloolefin polymer (COP), and cycloolefin copolymer (COC).

The roll-to-roll production line may follow the movement path of the substrate, adjusting the order of multiple coating steps or incorporating any number of additional stages as required. For example, in order to achieve an appropriate post-treatment process, pressure rollers or plasma equipment can be installed in the production line.

In some embodiments, the formed metal nanowires may be further post-processed to increase their electrical conductivity. The post-processing may include heating, plasma treatment, corona discharge, UV ozone, pressure, or a combination of the above processes. For example, after the curing to form the metal nanowire layer NWL, a roller may be used to apply pressure on the metal nanowire layer NWL. In one embodiment, a pressure of 50 to 3400 psi may be applied to the metal nanowire layer NWL by one or more rollers, preferably a pressure of 100 to 1000 psi, 200 to 800 psi, or 300 to 500 psi may be applied. The above step of applying pressure is preferably performed before the step of coating the film layer. In some embodiments, heat and pressure post-processing may be performed at the same time. Specifically, the formed metal nanowires may be applied with pressure via one or more rollers as described above and heated simultaneously. For example, the pressure applied by the roller is 10 to 500 psi, preferably 40 to 100 psi, while heating the roller to between about 70° C. and 200° C., preferably between about 100° C. and 175° C., which can increase the metal nanowire conductivity. In some embodiments, the metal nanowire is preferably exposed to a reducing agent for post-treatment. For example, the metal nanowire including silver nanowire is preferably exposed to a silver reducing agent for post-treatment. The silver reducing agent includes boron hydride (such as sodium borohydride), boron nitrogen compound (such as dimethylaminoborane (DMAB)), or gas reducing agent (such as hydrogen ($H_2$)). The exposure time is about 10 seconds to about 30 minutes, preferably about 1 minute to about 10 minutes. Other details of this embodiment are generally as described in the above embodiment and will not be repeated herein.

The structures of the different embodiments of the present disclosure may reference each other and are not limited to the above specific embodiments. In some embodiments of the present disclosure, the electroless plating metal layer may be directly formed without an additional catalytic layer, so as to simplify the process and control the production cost. In some embodiments of the present disclosure, the patterned layer may be used as an etching mask, so that the two-layer structure (for example, the upper layer is a metal nanowire layer and the lower layer is a metal layer) may be etched at one time to produce a peripheral lead wire of a peripheral area and/or a designation or other electrodes. The disclosed method(s) can avoid the alignment error area reserved during the alignment process, so the disclosed method(s) can effectively reduce the width of the peripheral area. In some embodiments of the present disclosure, the one-step etching of the metal nanowire layer and the metal layer is used to omit the alignment error area for alignment, so as to form a periphery lead wire with a smaller width, meeting the requirement of a narrow border, simplifying the process, and controlling the production cost.

According to some embodiments of the present disclosure, a method for forming a touch panel includes providing a substrate, forming a metal layer, forming a metal nanowire layer, and performing a patterning process. The substrate includes a visible area and a periphery area. Forming the metal layer includes performing pre-treatment of the substrate, adjusting the characteristics of a surface of the substrate, forming a catalytic center on the surface of the substrate, adjusting the activity of the catalytic center, and performing electroless plating on the surface of the substrate to form the metal layer. The first portion of the metal nanowire layer is located in the visible area, and the second portion of the metal nanowire layer and the metal layer are located in the periphery area. The patterning process includes using an etchant that may etch the metal layer and the metal nanowire layer to form the metal layer into a plurality of periphery lead wires and simultaneously form the second portion of the metal nanowire layer into a plurality of etching layers.

In some embodiments of the present disclosure, the patterning process further includes using an etchant to form the first portion of the metal nanowire layer into touch sensing electrodes which are disposed in the visible area of the substrate, and the touch sensing electrodes are electrically connected to periphery lead wires. In some embodiments of the present disclosure, performing pre-treatment of the substrate includes cleaning, degreasing, and roughening the substrate. In some embodiments of the present disclosure, adjusting the characteristics of the surface of the substrate includes adjusting the surface potential, surface tension, and hydrophilicity of the surface. In some embodiments of the present disclosure, adjusting the characteristics of the surface of the substrate includes positively charging the surface. In some embodiments of the present disclosure, forming the catalytic center on the surface of the substrate includes providing a colloidal metal active solution and attaching the colloidal metal to the surface to form the catalytic center with low activity (i.e., a first activity). In some embodiments of the present disclosure, adjusting the activity of the catalytic center includes removing the colloid (decollide) to form the catalytic center with high activity (i.e., a second activity), with the catalytic center activity after the removing of the colloid being higher than before the removing of the colloid. In some embodiments of the present disclosure, the patterning process further includes using etchant to form a plurality of designations from the metal layer, and the etching layer includes a plurality of first covers and second covers, with each first cover being disposed on the corresponding periphery lead wire and each second cover being disposed on the corresponding designation. In some embodiments of the present disclosure, the method further includes disposing a film layer. In some embodiments of the present disclosure, the method may be performed on one or both sides of the substrate.

According to some embodiments of the present disclosure, a method for forming a touch panel includes providing a substrate, forming a metal layer, forming a metal nanowire layer, and performing a patterning process to form the metal nanowire layer into a touch sensing electrode located in a visible area and electrically connected to a periphery lead wire. The substrate includes a visible area and a periphery area. Forming the metal layer includes performing pre-treatment of the substrate, adjusting the characteristics of a surface of the substrate, forming a catalytic center on the surface of the substrate, adjusting the activity of the catalytic center, and performing electroless plating on the surface of the substrate to form the metal layer which includes a pattern and forms a plurality of periphery lead wires located in the periphery area.

In some embodiments of the present disclosure, forming a catalytic center on the surface of the substrate includes forming a catalytic center on a specific area of the surface, and performing electroless plating on the surface of the substrate to form the metal layer includes forming the metal layer on the specific area to make the periphery lead wire. In some embodiments of the present disclosure, the patterned layer is formed by flexography printing, relief printing, gravure printing, or screen printing. In some embodiments of the present disclosure, forming the metal layer and the metal nanowire layer includes forming the metal layer in the periphery area, and then forming the metal nanowire layer in the visible area and the periphery area, with the first portion being located in the visible area and formed on the substrate and the second portion being located in the periphery area and formed on the metal layer. In some embodiments of the present disclosure, forming the metal layer in the periphery area includes selectively forming the metal layer in the periphery area and not in the visible area. In some embodiments of the present disclosure, forming the metal layer in the periphery area includes forming the metal layer in the periphery area and the visible area, and removing the metal layer located in the visible area. In some embodiments of the present disclosure, forming the metal layer and the metal nanowire layer includes forming the metal nanowire layer in the visible area and the periphery area, and then forming the metal layer in the periphery area, with the metal layer being located on the second portion.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of forming a touch panel, comprising:
providing a substrate, wherein the substrate comprises a visible area and a periphery area;
forming a metal layer, comprising:
performing a pre-treatment of the substrate;
adjusting one or more characteristics of a surface of the substrate;
forming a catalytic center on the surface of the substrate;
adjusting an activity of the catalytic center; and
performing an electroless plating on the surface of the substrate to form the metal layer;
forming a metal nanowire layer, wherein a first portion of the metal nanowire layer is located in the visible area and a second portion of the metal nanowire layer is located in the periphery area; and
performing a patterning process, comprising forming the metal layer into a plurality of periphery lead wires and simultaneously forming the second portion of the metal nanowire layer into a plurality of etching layers using an etchant that etches the metal layer and the metal nanowire layer.

2. The method of claim 1, wherein performing the patterning process further comprises forming the first portion of the metal nanowire layer into a touch sensing electrode using the etchant, and the touch sensing electrode is disposed in the visible area of the substrate and is electrically connected to the periphery lead wires.

3. The method of claim 1, wherein performing the pre-treatment of the substrate comprises cleaning, degreasing, and roughening the substrate.

4. The method of claim 3, wherein adjusting the one or more characteristics of the surface of the substrate comprises adjusting a surface potential, a surface tension, and a hydrophilicity of the surface.

5. The method of claim 4, wherein adjusting the one or more characteristics of the surface of the substrate comprises positively charging the surface.

6. The method of claim 4, wherein forming the catalytic center on the surface of the substrate comprises:
providing a colloidal metal active solution; and
attaching a colloidal metal of the colloidal metal active solution to the surface to form the catalytic center with a first activity.

7. The method of claim 6, wherein adjusting the activity of the catalytic center comprises removing a colloid of the colloidal metal active solution to form the catalytic center with a second activity, and the second activity is higher than the first activity.

8. The method of claim 1, wherein performing the patterning process further comprises forming the metal layer into a plurality of designations using the etchant, the etching layers comprise a plurality of first covers and a plurality of second covers, each first cover of the first covers is disposed on a corresponding periphery lead wire of the periphery lead wires, and each second cover of the second covers is disposed on a corresponding designation of the designations.

9. The method of claim 1, further comprising forming a film layer.

10. The method of claim 1, wherein the method is performed on one side or on two opposing sides of the substrate.

11. A method of forming a touch panel, comprising:
providing a substrate, wherein the substrate comprises a visible area and a periphery area;
forming a metal layer, comprising:
performing a pre-treatment of the substrate;
adjusting one or more characteristics of a surface of the substrate;
forming a catalytic center on the surface of the substrate;
adjusting an activity of the catalytic center; and
performing an electroless plating on the surface of the substrate to form the metal layer, wherein the metal layer comprises a pattern and forms a plurality of periphery lead wires located in the periphery area;
forming a metal nanowire layer; and
performing a patterning process to form the metal nanowire layer into a touch sensing electrode located in the visible area and electrically connected to the periphery lead wires.

12. The method of claim 11, wherein performing the pre-treatment of the substrate comprises cleaning, degreasing, and roughening.

13. The method of claim 12, wherein adjusting the one or more characteristics of the surface of the substrate comprises adjusting a surface potential, a surface tension, and a hydrophilicity of the surface.

14. The method of claim 13, wherein adjusting the one or more characteristics of the surface of the substrate comprises positively charging the surface.

15. The method of claim 13, wherein forming the catalytic center on the surface of the substrate comprises:
providing a colloidal metal active solution; and
attaching a colloidal metal of the colloidal metal active solution to the surface to form the catalytic center with a first activity.

16. The method of claim 15, wherein adjusting the activity of the catalytic center comprises removing a colloid of the colloidal metal active solution to form the catalytic center with a second activity, and the second activity is higher than the first activity.

17. The method of claim 11, wherein performing the electroless plating on the surface of the substrate to form the metal layer comprises etching the metal layer into the periphery lead wires.

18. The method of claim 11, wherein forming the catalytic center on the surface of the substrate comprises forming the catalytic center in a specific area of the substrate, and performing the electroless plating on the surface of the substrate to form the metal layer comprises forming the metal layer in the specific area to form the periphery lead wires.

19. The method of claim 11, wherein the method is performed on one side or on two opposing sides of the substrate.

20. A touch panel formed by a method, comprising: providing a substrate, wherein the substrate comprises a visible area and a periphery area; forming a metal layer, comprising: performing a pre-treatment of the substrate; adjusting one or more characteristics of a surface of the substrate; forming a catalytic center on the surface of the substrate; adjusting an activity of the catalytic center; and performing an electroless plating on the surface of the substrate to form the metal layer; forming a metal nanowire layer, wherein a first portion of the metal nanowire layer is located in the visible area and a second portion of the metal nanowire layer is located in the periphery area; and performing a patterning process, comprising forming the metal layer into a plurality of periphery lead wires and simultaneously forming the second portion of the metal nanowire layer into a plurality of etching layers using an etchant that etches the metal layer and the metal nanowire layer.

\* \* \* \* \*